United States Patent
Goldberg et al.

(10) Patent No.: US 10,057,323 B2
(45) Date of Patent: Aug. 21, 2018

(54) DISTRIBUTED WORK PROCESSING ACROSS A NETWORK WHERE EACH MACHINE IS OPERATIVE AS BOTH AN APPLICATION SERVER AND A DATABASE SERVER

(71) Applicant: Phizzle, Inc., San Francisco, CA (US)

(72) Inventors: Stephen Goldberg, Thornton, CO (US); Zachary Folwer, Westminster, CO (US); Kirk Sutton, Lafayette, CO (US); Kyle Bernhardy, Denver, CO (US)

(73) Assignee: PHIZZLE, INC., San Francisco, CA (US)

( * ) Notice: Subject to any disclaimer, the term of this patent is extended or adjusted under 35 U.S.C. 154(b) by 226 days.

(21) Appl. No.: 15/007,083

(22) Filed: Jan. 26, 2016

(65) Prior Publication Data

US 2017/0214572 A1    Jul. 27, 2017

(51) Int. Cl.
| | |
|---|---|
| G06F 15/173 | (2006.01) |
| H04L 29/08 | (2006.01) |
| G06F 17/30 | (2006.01) |
| G06F 9/445 | (2018.01) |
| H04L 12/24 | (2006.01) |

(52) U.S. Cl.
CPC .......... *H04L 67/02* (2013.01); *G06F 9/445* (2013.01); *G06F 17/30321* (2013.01); *G06F 17/30598* (2013.01); *H04L 41/0806* (2013.01)

(58) Field of Classification Search
CPC ..... G06F 17/30321; G06F 9/445; H04L 67/02

USPC .......................................... 709/223; 707/741
See application file for complete search history.

(56) References Cited

U.S. PATENT DOCUMENTS

| | | | |
|---|---|---|---|
| 2007/0106772 A1* | 5/2007 | Johnson | G06F 9/445 709/223 |
| 2011/0041006 A1 | 2/2011 | Fowler | |
| 2015/0032757 A1* | 1/2015 | Barykin | G06F 17/30321 707/741 |

OTHER PUBLICATIONS

International Search Report and Written Opinion issued to international patent application No. PCT/US17/14332, dated Apr. 17, 2017, 12 pgs.

* cited by examiner

*Primary Examiner* — Kyung H Shin
(74) *Attorney, Agent, or Firm* — John Bruckner PC (57) ABSTRACT

A first cluster of machines is configured as writer cluster application servers, where each machine of the first cluster is operative as both an application server and a database server with persistent storage of the database server disabled. A second cluster of machines is configured as database cluster servers, where each machine of the second cluster is operative as both an application server and a database server with the application server disabled. A third cluster of machines is configured as read cluster application servers, where each machine of the third cluster is operative as both an application server and a database server with persistent storage of the database server disabled. At least one application is executed on the read cluster application servers.

9 Claims, 7 Drawing Sheets

DISTRIBUTED WORK PROCESSING ACROSS A NETWORK WHERE EACH MACHINE IS OPERATIVE AS BOTH AN APPLICATION SERVER AND A DATABASE SERVER

FIELD OF THE INVENTION

This invention relates generally to distributed data processing in a computer network. More particularly, this invention is directed toward distributed work processing across a network where each machine in the network is operative as an application server and a database server.

BACKGROUND OF THE INVENTION

Figure 1:
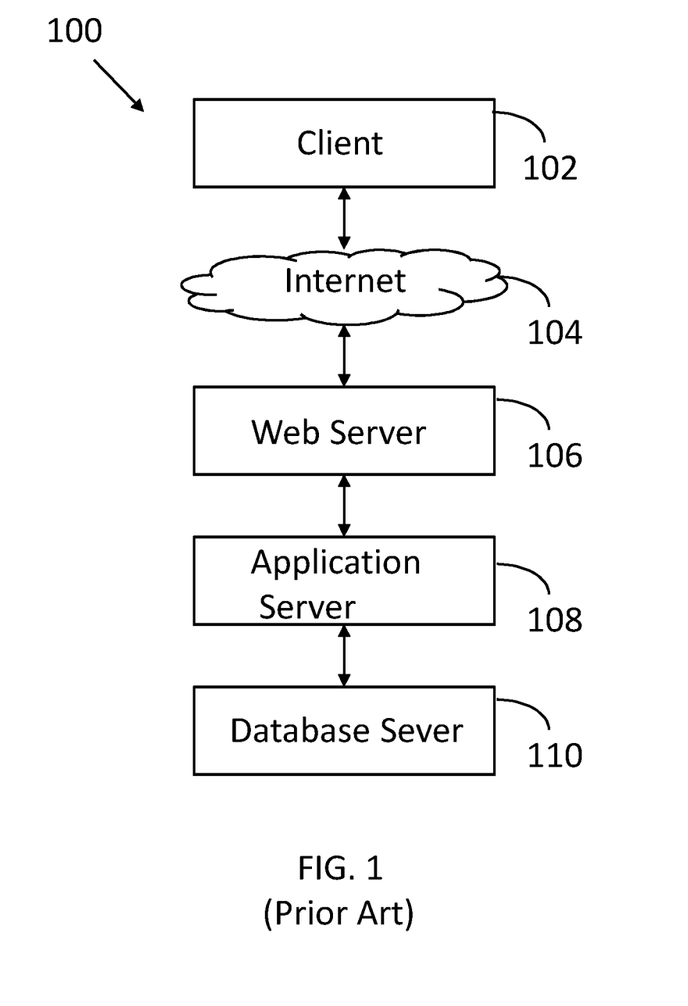
FIG. 1 illustrates a prior art network architecture.

FIG. 1 illustrates a typical network 100 including a client device 102 (e.g., a personal computer, tablet, mobile device, wearable device and the like) that communicates via the Internet 104. A web server 106 supplies the client 102 with web content (e.g., HTML content) utilizing HTTP as a transport mechanism across the Internet 104.

As used herein, the term server program refers to a set of executable code that processes and responds to requests from other machines or software clients in a client-server network architecture. The server program executes on a set of hardware resources (either actual or virtual machines) that turn the hardware resources into a server machine. A server machine implies computing resources that are more powerful and reliable than standard personal computers. Server machines are commonly deployed as large clusters of relatively simple, replaceable machines.

FIG. 1 also illustrates an application server 108, which may be directly accessed by the client 102 through the Internet 104 or may be accessed by the client 102 via the web server 106. That is, the web server 106 may rely upon the application server 108 to process requests from the client 102. An application server 108 may incorporate the functions of a web server (e.g., host web applications). However, the term application server typically implies additional functionality, such as application level services, transaction support, messaging and the like.

FIG. 1 also illustrates a database server 110. The application server 108 may rely upon the database server 110 to access data records. A database server maintains and shares any form of database over a network.

Figure 2:
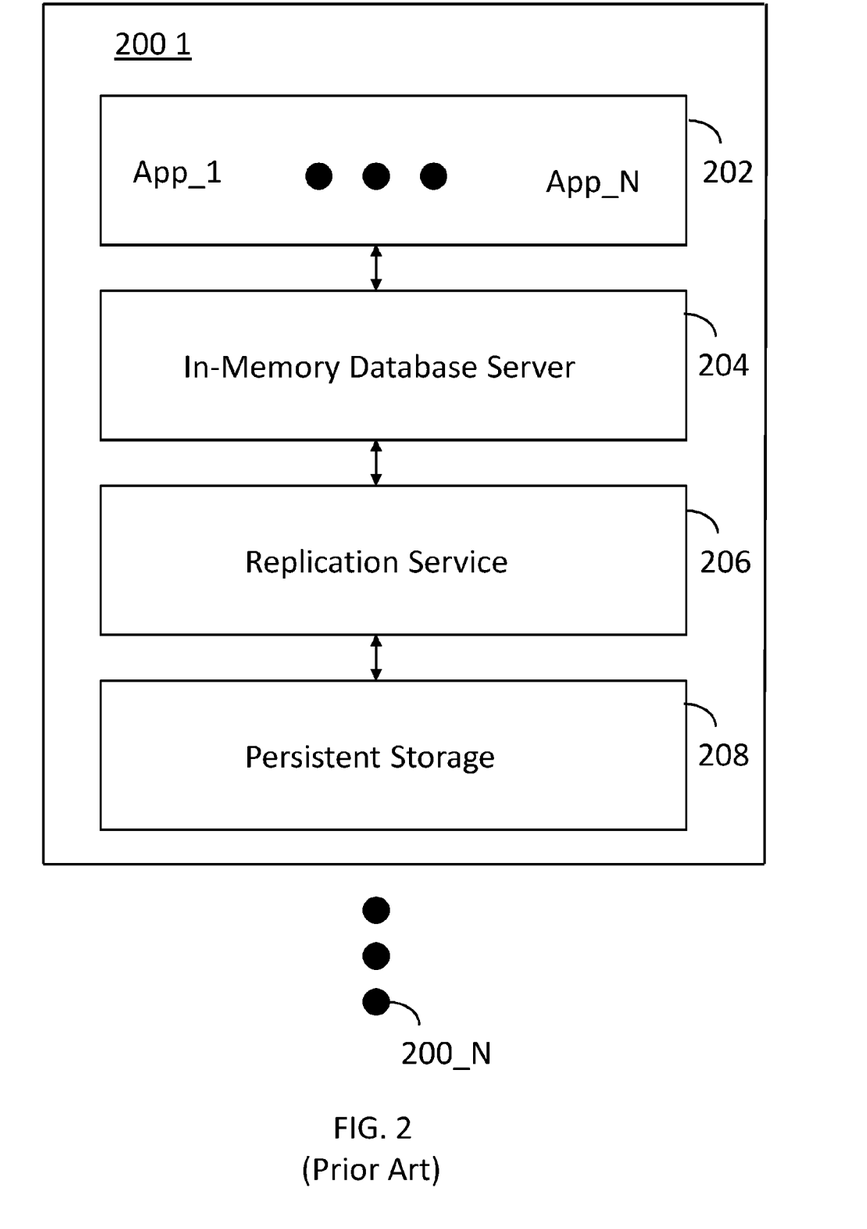
FIG. 2 illustrates a prior art server configured as both an application server and a database server.

In a typical deployment the web server 106, the application server 108 and the database server 110 operate on separate server machines or clusters of server machines. FIG. 2 illustrates an alternate prior art approach. In this approach, server 200_1 executes both an application server 202 including a set of applications (App_1 through App_N) and an in-memory database server 204. As its name implies, the in-memory database server 204 is a database in random access memory and therefore has data access speed advantages. The in-memory database server 204 as an associated replication service 206. The replication service 206 is used to coordinate a replication of the in-memory database in persistent storage 208. The combined application server 202 and in-memory database server 204 are sold by SAP SE, Walldorf, Germany as the HANA® server. The HANA® server is typically deployed on a set of machines forming a cluster. Clusters of such machines are used to address scaling issues. In practice, it has been recognized that appropriate scale is not obtained by simply adding additional nodes or machines.

In view of the foregoing, it would be desirable to identify an improved approach to distributed work processing across a network where each server is operative as an application server and a database server.

SUMMARY OF THE INVENTION

A method includes configuring a first cluster of machines as writer cluster application servers, where each machine of the first cluster is operative as an application server and a database server with persistent storage of the database server disabled. A second cluster of machines is configured as database cluster servers, where each machine of the second cluster is operative as an application server and a database server with the application server disabled. A third cluster of machines is configured as read cluster application servers, where each machine of the third cluster is operative as an application server and a database server with persistent storage of the database server disabled. At least one application is executed on the read cluster application servers.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 3:
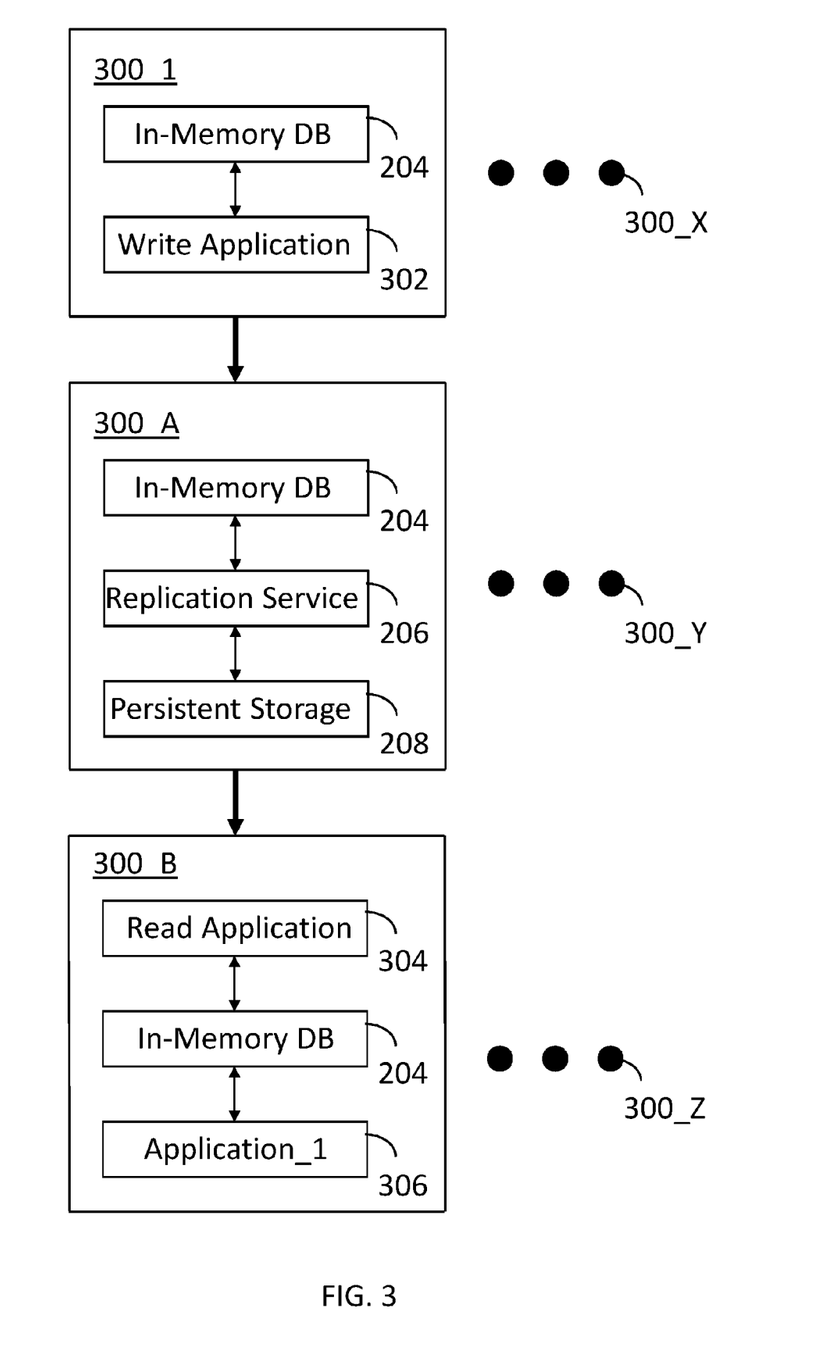
FIG. 3 illustrates a network architecture in accordance with an embodiment of the invention.

FIG. 3 illustrates a computer architecture configured in accordance with an embodiment of the invention. A first cluster of servers 300_1 through 300_X are configured as write cluster application servers. Each node of the write cluster applications servers is operative as an application server and a database server with persistent storage of the database server disabled. For example, server 300_1 has a write application 302 executing on the application server and an in-memory database 204 executing on the database server. The replication service 206 of FIG. 2 is disabled such that a persistent version of the in-memory database 204 is not maintained. Accordingly, if the server machine 300_1 crashes, upon reboot a persistent version of the in-memory database need not be loaded into the in-memory database. This facilitates quick recovery in the event of a crash.

FIG. 3 also illustrates a second cluster of servers 300_A through 300_Y configured as database cluster servers. Each machine of the second cluster is operative as an application server and a database server with the application server disabled. The database server, including the in-memory database 204, the replication service 206 and persistent storage 208 are operative. Thus, this cluster is operative purely as a database server, including persistent storage of the in-memory database. Since the application server has minimal or no tasks to perform, the database server operations are optimized in the sense that computational activity associated with the server is devoted to the database server.

FIG. 3 also illustrates a third cluster of servers 300_B through 300_Z configured as read cluster application servers. Each machine in this cluster is operative as an application server and a database server with persistent storage of the database server disabled. Thus, each machine has a read application 304, an in-memory database 204 and at least one application 306 operating on the data in the in-memory database 204. The read application 304 is operative to read data from the second cluster.

Thus, the architecture of FIG. 3 represents a novel and non-obvious utilization of a collection of servers where each server is both an application server and a database server. Instead of achieving scale by adding additional servers with each server performing its conventional functions both as an application server and a database server, the invention achieves scale by optimizing either application server operations or database server operations at individual nodes. The write cluster application servers utilize the application server for write operations. The write cluster application servers utilize the in-memory database of the database server, but not the persistent storage facility of the database server. The database cluster servers omit most if not all application server operations, while utilizing the full services of the database server, including the in-memory database and persistent storage. The read cluster application servers utilize the application server for a read application and at least one additional application (e.g., analytics, visualizations, business intelligence, messaging, and the like). The read cluster application servers only utilize the in-memory database facility of the database server, while disabling persistent storage.

Thus, the first cluster and the third cluster can perform in an optimized manner since computational resources are not devoted to persistent storage operations. This is particularly advantageous in the event of a node crash since persistent storage need not be loaded into the in-memory database upon reboot. Nevertheless, a persistent version of the data is available from the second cluster, if need be. The second cluster optimally performs database server operations without the burden of material application server computations.

Figure 4:
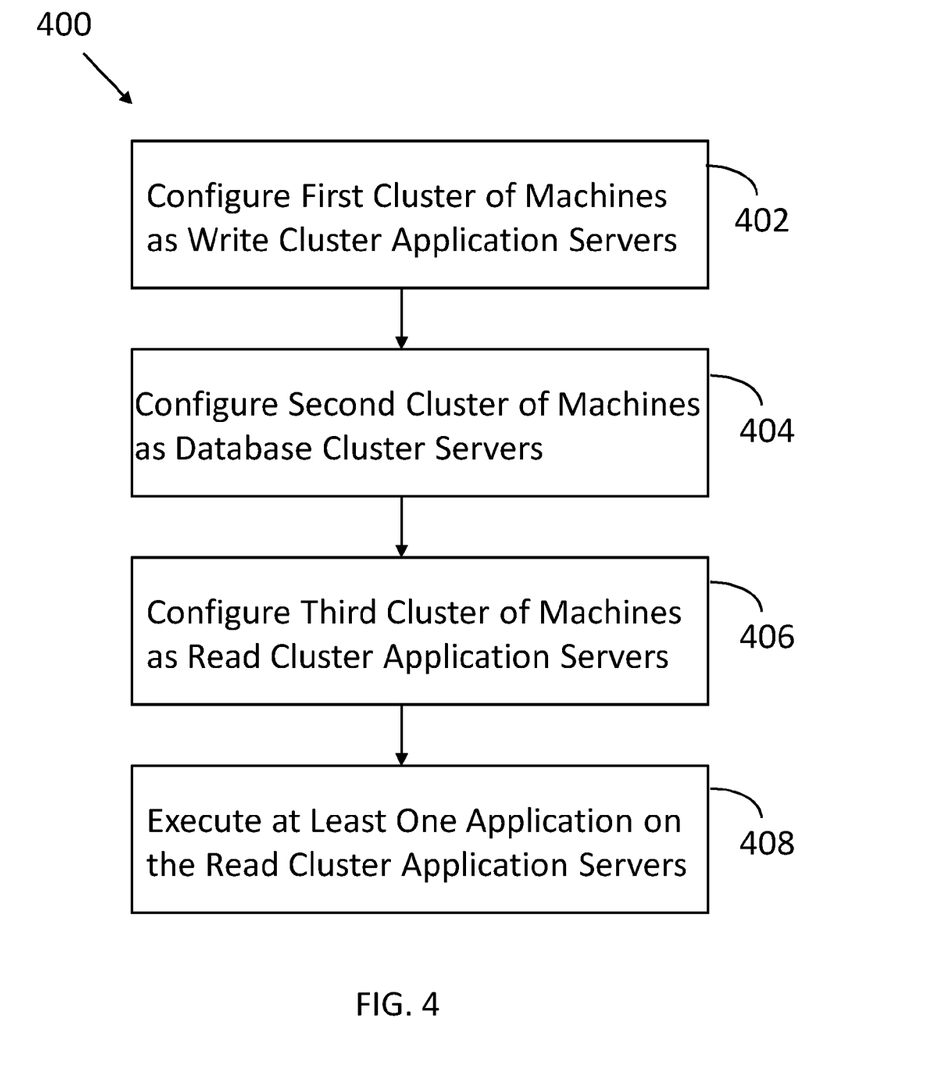
FIG. 4 illustrates a method performed in accordance with an embodiment of the invention.

FIG. 4 illustrates processing operations 400 associated with an embodiment of the invention. Initially, a first cluster of machines is configured as write cluster application servers 402. Servers 300_1 through 300_X represent such a cluster. Each machine of the first cluster is operative as an application server and a database server with persistent storage of the database server disabled. As used herein, disabling persistent storage means that between 0% and 25%, preferably less than approximately 15% of the data in the in-memory database is also stored in persistent memory.

Next, a second cluster of machines is configured as database cluster servers 404. Servers 300_A through 300_Y represent such a cluster. Each machine of the second cluster is operative as an application server and a database server with the application server disabled. As used herein, the term disabled means that between 0% and 25%, preferably less than approximately 15% of the average computational resources of the server are devoted to application server activity.

The next operation of FIG. 4 is to configure a third cluster of machines as read cluster application servers 406. Servers 300_B through 300_Z represent such a cluster. Each machine of the third cluster is operative as an application server and a database server with persistent storage of the database server disabled.

Finally, at least one application is executed on the read cluster application servers 408. Thus, unlike a conventional deployment where the application servers are widely engaged throughout the cluster, in this configuration application server activity is concentrated on the read cluster application servers.

Figure 5:
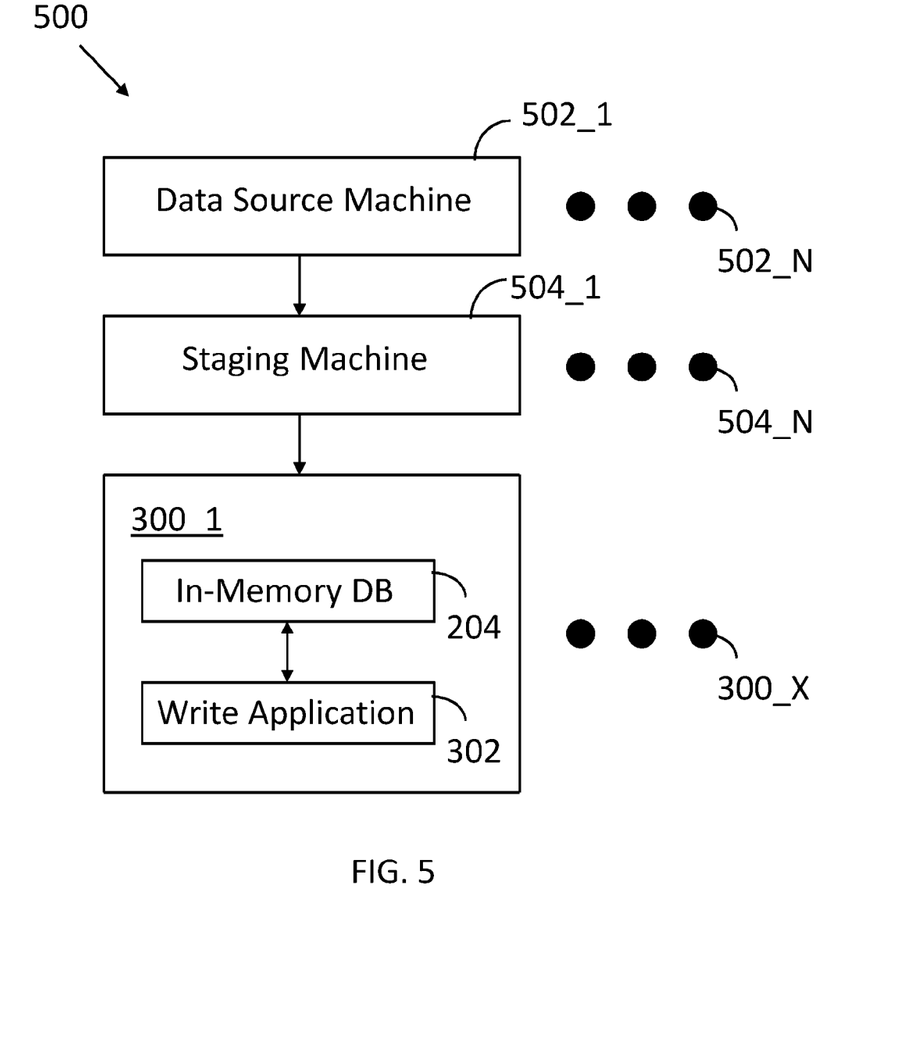
FIG. 5 illustrates a network architecture for writing data to a server configured as both an application server and a database server.

FIG. 5 illustrates an architecture 500 utilized in accordance with an embodiment of the invention. A set of data source machines 502_1 through 502_N source data, such as batch data, script data, SQL data, noSQL data, stream data and the like. One or more staging machines 504_1 through 504_N receive the data. As the name implies, the staging machines prepare the data for writing to the write cluster application servers 300_1 through 300_X.

Figure 6:
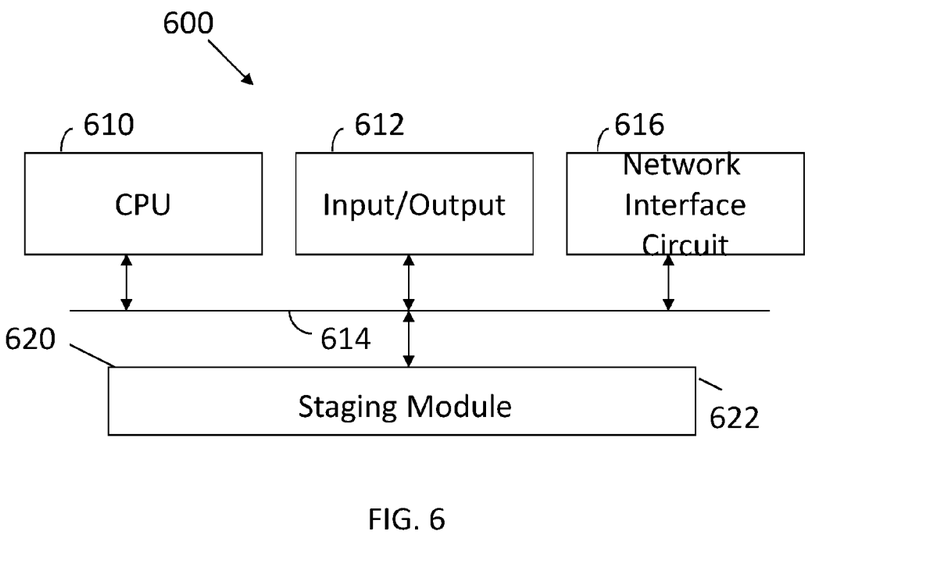
FIG. 6 illustrates a staging machine utilized in accordance with an embodiment of the invention.

FIG. 6 illustrates a staging machine 600 utilized in accordance with an embodiment of the invention. The machine 600 may include standard components, such as a central processing unit 610 and input/output devices 612 connected via a bus 614. The input/output devices 612 may include a keyboard, mouse, touch display and the like. A network interface circuit 616 is also connected to the bus 614. The network interface circuit 616 provides connectivity to any network. A memory 620 is also connected to the bus 614. The memory 620 stores instructions executed by the CPU 610 to implement operations of the invention. In one embodiment, the memory 620 stores a staging module 622.

It should be appreciated that the other machines referenced herein have an architecture of the type shown in FIG. 6. While some machines may omit input/output devices 612, each includes at least a CPU 610, a bus 614, a network interface circuit 616 and a memory 620 to store instructions executed by the CPU 610.

Figure 7:
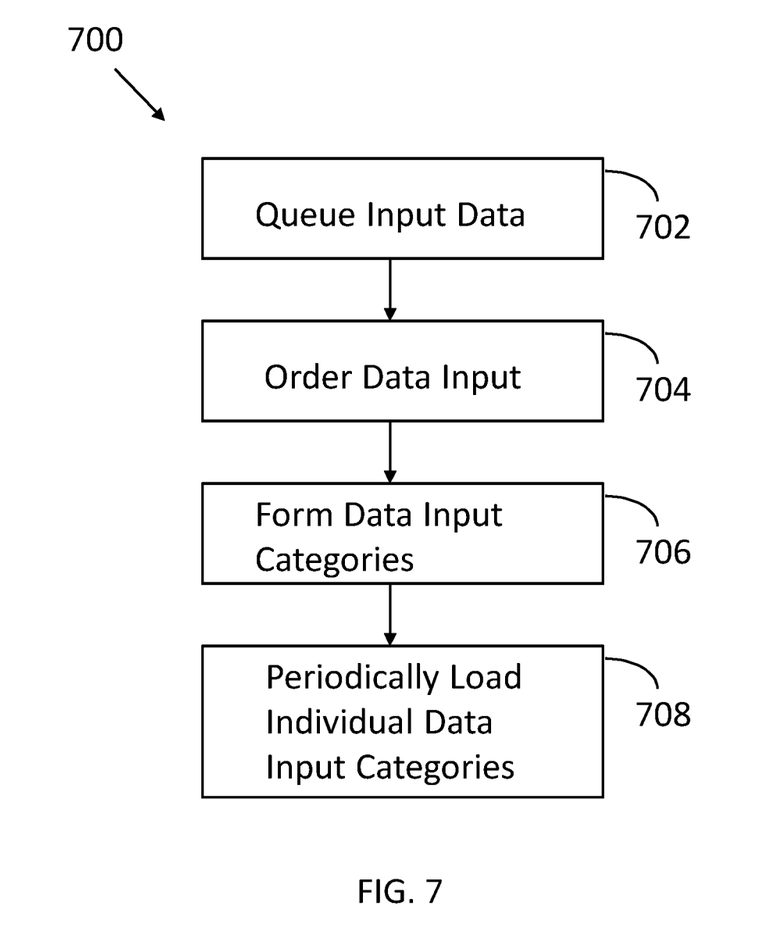
FIG. 7 illustrates processing operations performed during data staging in accordance with an embodiment of the invention.

FIG. 7 illustrates operations 700 associated with an embodiment of the staging module 622. Initially input data is queued. For example, in the event of a transaction against a NoSQL data store, the transaction is placed in a time based, durable, highly available queue in the sequence that the transaction occurred (transaction record order). Next, the data input is ordered 704. That is, an ordered list of values is formed, such as an array, vector, list or sequence. In one embodiment, the ordered list is in name/value pairs. In one embodiment, JavaScript Object Notation (JSON) is utilized.

Data input categories are then formed 706. For example, one may form a record insert category, a record update category and a record delete category. Tables may be formed for each category. Thus, one may have a record insert table, a record update table and a record delete table. These tables are resident in a database associated with the staging module 622, referred to as a staging database. Using data input categories allows for more efficient loading operations. A database server performs more efficiently when executing a single operation, such as an insert, update or delete.

The final operation in FIG. 7 is to periodically load individual data input categories 708. For example, every thirty seconds the staging module 622 may pull records from the staging database and send them to the write cluster. After successful completion of the load into the write cluster the records are cleared from the staging database. If the records do not load they stay in the staging database for the next pass of synchronization operations.

The machines of the write cluster have a native application program interface (API) that may be used to load records. Alternately or in addition, a custom method service may be deployed on the machines of the write cluster. The custom method service may facilitate the loading of records on its own or in conjunction with the API.

Conventional prior art deployments of clusters of servers operative as application servers and database servers function poorly when handling reads or writes in excess of one million records per second. The architecture disclosed herein overcomes that limitation and supports reads and writes of 100s of millions of records per second.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method, comprising:
configuring a first cluster of machines as writer cluster application servers, wherein each machine of the first cluster is operative as both i) an application server and ii) database server, with persistent storage of the database server disabled so that between 0% and 25% of the data in the in-memory database is also stored in persistent memory;
configuring a second cluster of machines as database cluster servers, wherein each machine of the second cluster is operative as both i) an application server and ii) database server, with the application server operating with between 0% and 25% of the average computational resources of the application server devoted to application server activity;
configuring a third cluster of machines as read cluster application servers, wherein each machine of the third cluster is operative as both i) an application server and ii) database server, with persistent storage of the database server disabled so that between 0% and 25% of the data in the in-memory database is also stored in persistent memory; and
executing at least one application on the read cluster application servers.

2. The method of claim 1 further comprising collecting data at a staging machine including i) periodically loading input data from a data source machine and ii) sending the data to a write cluster application, the staging machine including a central processing unit, memory storing a staging module and input/output devices connected via a bus.

3. The method of claim 2 further comprising:
queuing the input data;
ordering the input data; and
forming individual input categories.

4. The method of claim 3 wherein ordering includes forming an ordered list of values.

5. The method of claim 3 wherein configuring the first cluster of machines as write cluster application servers includes configuring each machine with a custom method service to receive the individual input categories.

6. The method of claim 5 wherein the custom method service interacts with the native application program interface of the first cluster of machines.

7. The method of claim 2 wherein queuing includes queuing in transaction record order.

8. An apparatus, comprising:
a first cluster of machines including writer application servers, wherein each machine of the first cluster is operative as both i) an application server and ii) a database server, with persistent storage of the database server disabled so that between 0% and 25% of the data in the in-memory database is also stored in persistent memory;
a second cluster of machines including database servers, wherein each machine of the second cluster is operative as both i) an application server and ii) a database server, with the application server operating with between 0% and 25% of the average computational resources of the application server devoted to application server activity;
a third cluster of machines including read application servers, wherein each machine of the third cluster is operative as both i) an application server and ii) a database server, with persistent storage of the database server disabled so that between 0% and 25% of the data in the in-memory database is also stored in persistent memory,
wherein at least one application on the third cluster of machines is executed.

9. The apparatus of claim 8 further comprising a data source machine and a staging machine coupled to the data source machine, wherein the data source machine collects data including i) periodically loading input data from the data source machine and ii) sending data to a write cluster application, the staging machine including a central processing unit, memory storing a staging module and input/output devices connected via a bus.

* * * * *